United States Patent [19]

Howells

[11] 3,901,749

[45] Aug. 26, 1975

[54] METHOD AND APPARATUS FOR FORMING AN ENDLESS RIBBON

[75] Inventor: Richard E. H. Howells, West Carrollton, Ohio

[73] Assignee: NCR Corporation, Dayton, Ohio

[22] Filed: Aug. 27, 1974

[21] Appl. No.: 501,116

[52] U.S. Cl. ............... 156/73.3; 156/196; 156/251; 156/535; 156/580; 228/1; 242/58.1; 242/58.5; 264/69
[51] Int. Cl.² ..................... B32B 31/18; B32B 31/20
[58] Field of Search ......... 242/58.1, 58.5; 156/73.3, 156/251, 580, 535, 196; 228/1; 29/470.3; 264/69

[56] References Cited
UNITED STATES PATENTS
2,440,664  4/1948  Irons .................................. 156/196
3,574,037  4/1971  Beans et al. ........................ 156/73.4

Primary Examiner—Edward G. Whitby
Attorney, Agent, or Firm—J. T. Cavender; Albert L. Sessler, Jr.

[57] ABSTRACT

Ultrasonic energy is utilized for cutting and for simultaneously bonding or welding the ends of an ink ribbon so as to form an endless loop of predetermined length. The bond or weld in the loop is then pressed into a single layer thickness which is adaptable for printing therethrough.

25 Claims, 9 Drawing Figures

PATENTED AUG 26 1975 3,901,749

METHOD AND APPARATUS FOR FORMING AN ENDLESS RIBBON

BACKGROUND OF THE INVENTION

In the printing field, the use of a ribbon is well-known as a means for carrying the ink required in the printing process. The usual structure of such ribbon is in the form of a continuous length which has one end thereof attached to the inner core of one reel and the other end attached to the inner core of a second reel with provision being made for reversing the direction of travel of the ribbon. With the advent of smaller and more compact ribbon containers and mechanism for driving the ribbon, it is advantageous to provide an inking ribbon which, of course, as in the past, is capable of being reused and additionally is of a continuous loop for use in a single container. Such a continuous loop has been produced for use in printers. However the seam or connection point has been made in the nature of a lap, thus introducing an addtional thickness of ribbon material at the lap. This thickness of material may cause jams or like trouble in the operation of the ribbon, so it is desirable that the ends of a ribbon be joined as a butt seam or weld to provide a single thickness of material.

In the case of thermoplastic material, ultrasonic energy has been relied upon to bond together sheets of such material, as disclosed in Hewitt U.S. Pat. No. 3,419,447, wherein the tools both compress and heat overlapped areas of material to transpose the sheets into a common plane, bond the sheets to one another, and cut off a pair of unbonded edge portions. Sager U.S. Pat. No. 3,657,033 discloses method and apparatus for continuous cutting and joining of thermoplastic sheet material by use of an ultrasonically energized horn or blade.

SUMMARY OF THE INVENTION

The present invention relates to ink ribbons and more particularly to the producing of an endless ribbon for use in a single reel of the cassette type. A predetermined length of ribbon is measured and the ends of the ribbon are held together and an ultrasonically energized blade or horn is moved over the area of the ribbon near the ends thereof to cut and simultaneously seal such ends.

The sealed end is then laid flat to form a single layer of material thereabout and such sealed end is placed under a modified or different horn having a beveled edge to press the end and the immediate surrounding area into the thickness of a single layer of material.

Apparatus is provided for retaining the ribbon ends in the desired relationship and for performing the welding and flattening operations.

In view of the above discussion, the principal object of the present invention is to provide an endless ribbon of homogeneous structure for the entire length thereof.

Another object of the present invention is to provide a simple method for making such an endless ribbon.

An additional object of the present invention is to weld a ribbon of desired length and of sufficient strength at the weld to enable repeated cycling of the ribbon.

A further object of the present invention is to provide a bond or weld in the endless ribbon to enable printing therethrough without appreciable change in print density.

Another object of the present invention is to provide apparatus for efficiently performing the operations necessary to produce a single-layer bond or weld in a ribbon.

BRIEF DESCRIPTION OF THE DRAWING

Additional advantages and features of the present invention will become more apparent from a reading of the following specification taken together with the annexed drawings, in which.

DESCRIPTION OF THE PREFERRED EMBODIMENTS

Figure 1:
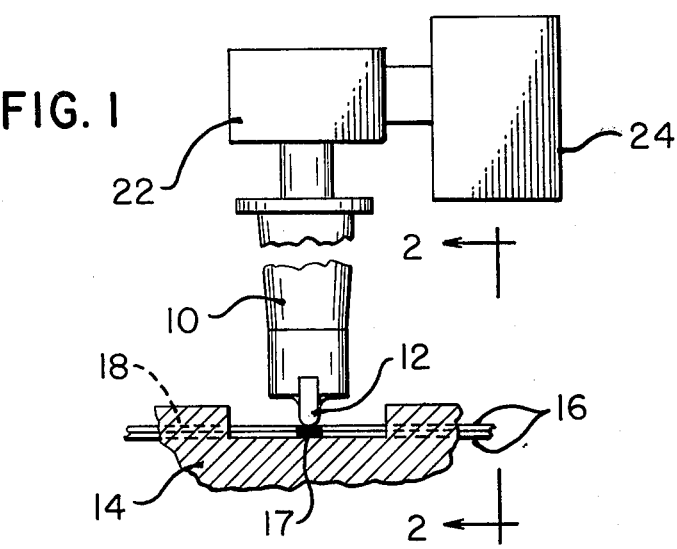
FIG. 1 is a front elevational view of an ultrasonic horn equipped with an appropriate tool illustrating the process of the present invention for cutting and welding the ribbon.
Figure 2:
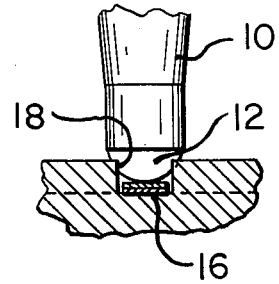
FIG. 2 is a side elevational view taken along line 2—2 of FIG. 1, of the ultrasonic horn performing the cutting and welding process as shown in FIG. 1.

Referring now to FIGS. 1 and 2 of the drawings, there is shown an ultrasonic horn 10 equipped with a suitable cutting and welding tool 12 adapted to coact with an anvil or table 14 to perform cutting and welding operations on an ink ribbon 16 made from a suitable thermoplastic material such as nylon. As is well-known, ultrasonic plastic bonding is accomplished by the mechanical compression and decompression of resilient plastic material at ultrasonic speeds. The vibrating motion or "hammering" is in the order of one to four thousandths of an inch. It is performed perpendicular to the plastic material being bonded, as it rests on a solid mass or "anvil". Due to the shape of the tool, and the force applied to it, the pressure at the tip, during welding, is usually quite high (approximately 2000 lbs./sq. inch with certain concentrated tool tips).

It will, of course, be understood that the invention is in no way limited to ink ribbons and can be used in connection with any other suitable sheet-like material where the object is to provide a smooth weld joint having substantially the same thickness as the material to be joined. The table 14 is provided with a recessed track 18 in which two thicknesses of the ribbon 16 are positioned to maintain it in a proper position with respect to the tool 12 for the cutting and welding operation.

Any suitable ultrasonic device may be employed for the various ultrasonic operations performed during the process of the present invention. Equipment which has been found to be satisfactory for carrying out this process is Model No. 302, manufactured by Ultrasonic Systems, Inc., Farmingdale, N.Y., although other ultrasonic cutting and welding devices could be used as well. In such equipment, the tool is vibrated by a transducer, shown diagrammatically at 22, to which the horn 10 is secured. The assembly consisting of the horn 10, the tool 12 and the transducer 22 can be shifted with respect to the table 14 and held in a desired position with respect to said table by means of a positioning means 24. In a first position, the horn, tool and transducer assembly is raised to a position in which it is spaced away from the table so that the ribbon 16 can conveniently be positioned in the track 18. In a second or operative position, the horn, tool and transducer assembly is lowered so that the tool 12 slightly compresses the thicknesses of the ribbon 16 in preparation for the cutting and welding operation. Since the transducer 22 and the positioning means 24 are existing well-known components of ultrasonic devices such as the aforementioned Model No. 302, they will not be described in detail herein.

Figure 3:
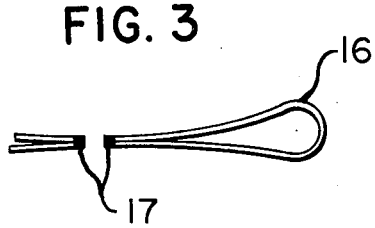
FIG. 3 is a view of the ribbon showing the welded portion and the cut-off ends after the operation shown in FIG. 1.

In order to perform the cutting and welding operation, the two ends of the ribbon 16 which are to be bonded together to provide a continuous loop ribbon are placed in superimposed relation, one atop the other, aligned and oriented in the same direction, in the recessed track 18 of the table 14. The ribbons are held in place by suitable means (not shown) and are passed under the tip of the welding and cutting tool 12 which, in the illustrated embodiment, is vibrating at a frequency of 20,000 cycles per second. In this embodiment, each thickness of the ribbon is 0.004 inch thick and the gap between the tool 12 at rest in a neutral position and the table 14 is 0.003 inch, thus providing compression of the ribbon material of 62.5%. The pass of the tool transversely across the ribbon, at 90° to its long dimension, fuses the two ends of the ribbon and also cuts therethrough at the point of fusion to separate the un-needed ends from the remainder of the ribbon, as shown in FIG. 3 of the drawing.

Figure 5:
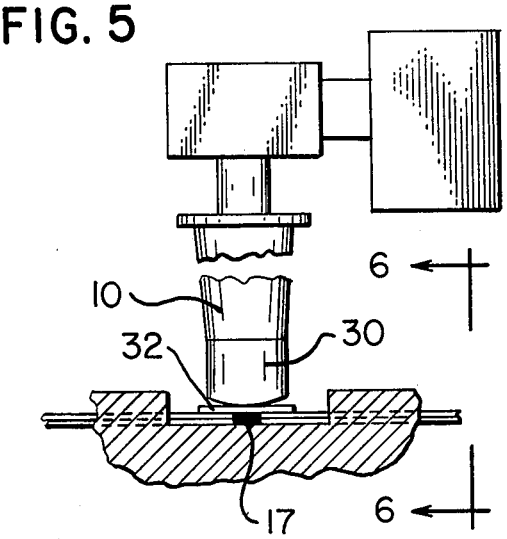
FIG. 5 is a front elevational view of the ultrasonic horn equipped with a different tool for flattening the ribbon in the weld area.
Figure 6:
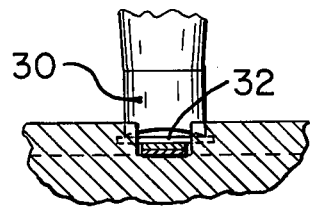
FIG. 6 is a side elevational view taken along line 6—6 of FIG. 5, of the ultrasonic horn performing the flattening process as shown in FIG. 5.
Figure 4:
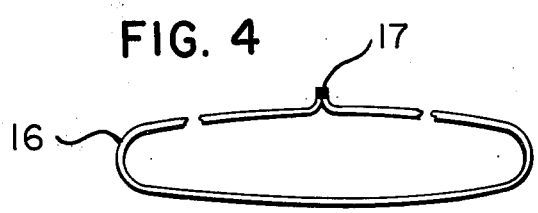
FIG. 4 is a view of the ribbon showing the portions of the ribbon adjacent to the weld spread apart in preparation for the flattening step of the process.

The ribbon loop which has thus been formed is now opened up by spreading apart those portions of the loop adjacent to the weld, as shown in FIG. 4. This loop is again placed in the recessed track 18 of the same or a different table 14, with the line 17 of the bond or weld centered under an ultrasonic horn 10 which may be the same horn as was used for the cutting and welding operation, or a different horn. A butt splice tool 30, as shown in FIGS. 5 and 6, is placed in the horn 10, and is used for the flattening operation. Said tool is provided with a slight bevel to facilitate its passage over the bond or weld line.

Figure 7:
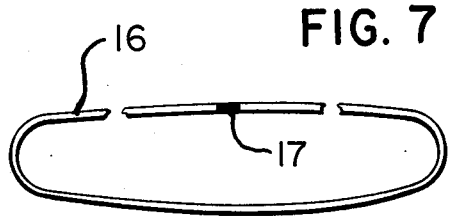
FIG. 7 is a view of the ribbon showing the welded flattened joint following completion of the process.

A metal shim 32, having a thickness of 0.003 inch in the illustrated embodiment, is placed atop the ribbon 16, between it and the tool 30. With the ultrasonic horn operating at its normal frequency of 20,000 cycles per second, the ribbon 16 is passed thereunder, with the weld line 17 in contact with the shim 32. This is effective to flatten the weld to the same thickness as the remainder of the ribbon, to provide an endless ribbon having a single thickness of material at the weld line 17, as shown in FIG. 7.

Figure 8:
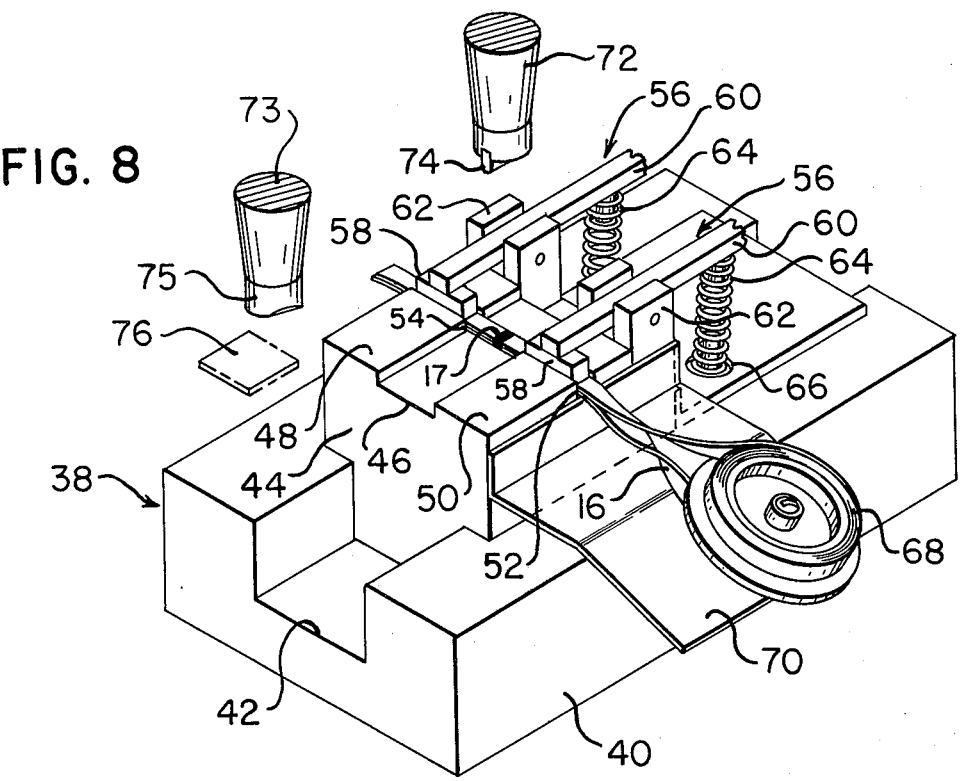
FIG. 8 is a perspective view of one embodiment of an apparatus for performing both a cutting and welding operation and a flattening operation on a ribbon.

Shown in FIG. 8 is one embodiment of an apparatus 38 for performing the method described above. Said apparatus includes a base member 40 provided with a slot 42 in which a table 44 is positioned for linear movement. The table 44 includes a central recess 46 with adjacent raised portions 48 and 50, having slots 52, 54, respectively, extending perpendicular to the recess 46, for receiving the ribbon 16 to be operated upon.

A retainer 56 cooperates with each slot 52, 54 to hold the ribbon 16 in place in the slot. Each retainer includes a shoe 58 secured to an arm 60 pivotally mounted on supports 62. Each shoe is urged into engagement with its corresponding slot by a spring 64 extending between the arm 60 and a bore 66 in the table 44. As is clear from FIG. 8, the shoes 58 can be lifted out of the slots 52, 54 against the force of the springs 64 to permit the ribbon 16 to be placed in and removed from said slots.

The ribbon 16 is supported on a reel 68 mounted on a flange 70 secured to one side of the table 44.

Two ultrasonic horns 72 and 73 are mounted on a frame (not shown) above the table 44, and can be shifted vertically into and out of operative relation to said table by positioning means similar to the means 24 shown in FIG. 1 and previously described. The horn 72, shown in position over the ribbon 16, has fixed thereto a cutting and welding tool 74, similar to that shown in FIGS. 1 and 2. The horn 73 has fixed thereto a butt splice or flattening tool 75, similar to that shown in FIGS. 5 and 6.

The apparatus 38 is prepared for operation by positioning the table 44 so that a double thickness of ribbon 16, located in the slots 52, 54 and retained therein by the shoes 58 of the retainers 56, is positioned beneath the horn 72. Said horn is initially in its raised position, so that the ribbon 16 can be conveniently placed in the slots 52, 54. Once the ribbon 16 has been properly positioned in the slots, and is retained there by the shoes 58, the horn 72 can be lowered into operative position so that the cutting and welding tool 74 is in contact with the ribbon 16.

A cutting and welding operation then takes place, as previously described, by initiating operation of the horn 72 and moving the table 44 so that the ribbon passes beneath the tool 74 in a direction perpendicular to the length of the ribbon. The horn 72 is then returned to its upper position. The retaining shoes 58 are lifted, the excess cut-off sections of the ribbon 16 are removed, and the welded ribbon 16 is removed from the slots 52, 54. The ribbon loop formed by the welding is then spread, as previously described, to the configuration diagrammatically shown in FIG. 4; the portions of the ribbon adjacent to and on each side of the weld line 17 are positioned in the slots 52, 54; and the shoes 58 are permitted to return to their retaining positions for holding the ribbon in the slots.

The table 44 is then shifted so that the weld line 17 of the ribbon 16 is positioned beneath the flattening tool 75 on the horn 73, which is in a raised position at this time. A metal shim 76 is placed over the weld line 17 on the ribbon, as previously described, and the horn 73, with attached tool 75, is shifted downwardly into operative position and energized to perform a flattening operation at the weld line 17 as the ribbon 16 is shifted transversely beneath said tool by movement of the table 44. This completes the welding and flattening operation, and the ribbon 16, which will be in the form shown in FIG. 7, may then be removed from the slots 52, 54.

Figure 9:
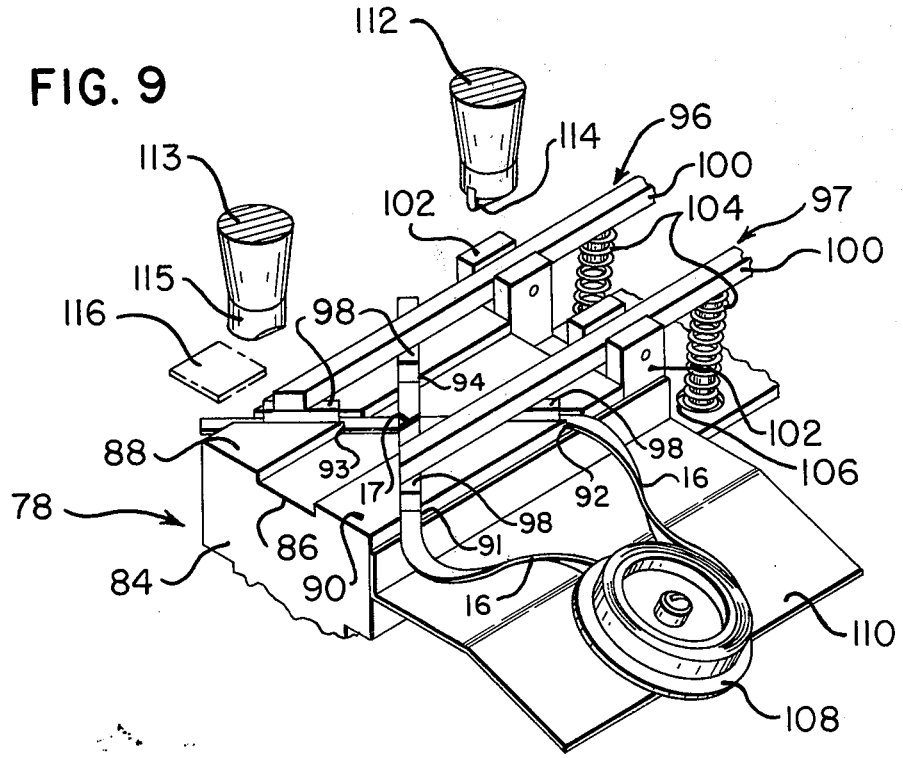
FIG. 9 is a perspective view of a second embodiment of an apparatus for performing both a cutting and welding operation and a flattening operation on a ribbon.

Shown in FIG. 9 is a second embodiment of an apparatus 78 for performing the method described above. This apparatus resembles the apparatus 38 of FIG. 8, and includes a base member similar to the base member 38 of FIG. 8 provided with a slot (not shown) in which a table 84 is positioned for linear movement. The table 84 includes a central recess 86 with adjacent raised portions 88 and 90, having slots 91, 92, 93, 94, respectively, extending at an angle of 45° to the center line of the recess 86, for receiving the ribbon 16 to be operated upon.

Retainers 96, 97 cooperate with the slots in each of the raised portions 88 and 90 to hold the ends of the ribbon 16 in the slot. Each retainer includes two shoes 98 secured to an arm 100 pivotally mounted on supports 102. Each shoe is urged into engagement with its corresponding slot by a spring 104 extending between the arm 100 and a bore 106 in the table 84. As is clear from FIG. 9, the shoes 98 can be lifted out of the slots 91, 92, 93, 94 against the force of the springs 104 to permit the ribbon 16 to be placed in and removed from said slots.

The ribbon 16 is supported on a reel 108 mounted on a flange 110 secured to one side of the table 84.

Two ultrasonic horns 112 and 113 are mounted on a frame (not shown) above the table 84, and can be shifted vertically into and out of operative relation to said table by positioning means similar to the means 21 shown in FIG. 1 and previously described. The horn 112, shown in position over the ribbon 16, has fixed thereto a cutting and welding tool 114, similar to that shown in FIGS. 1 and 2. The horn 113 has fixed thereto a butt splice or flattening tool 115, similar to that shown in FIGS. 5 and 6.

Operation of the apparatus 78 is similar to the operation of the apparatus 38, previously described, except that the ends of the ribbon 16 are superimposed in the slots 91, 92, 93, 94 in a different manner, as may clearly be seen from an examination of FIG. 9. In the embodiment of that Figure, as have been previously noted, the various slots are disposed at an angle of 45° with respect to the direction of movement of the table 84. Therefore when the ribbon ends are placed in the slots, one ribbon end is disposed at an angle of 90° with respect to the other ribbon end, and the line 17 along which the cutting and welding operation by the horn 112 and tool 116 takes place at the intersection of the ribbons is disposed at an angle of 45° with respect to the length of the ribbon. A half twist is put on one of the ribbon ends before it is disposed in the slots so that the resulting endless ribbon loop will have distinct inside and outside surfaces, and will not be in the form of a Mobius strip.

Following the cutting and welding operation, the retaining shoes 98 are lifted, the excess cut-off ends of the ribbon are discarded, and the ribbon 16 is removed from the slots 91, 92, 93, 94. The ribbon loop formed by the welding is then spread, as previously described, to the configuration diagrammatically shown in FIG. 4, and the portions of the ribbon adjacent to and on each side of the weld are positioned in two aligned slots such as 91, 94 or 92, 93.

The table 84 is then shifted so that the weld line 17 of the ribbon 16 is positioned beneath the flattening tool 118 on the horn 114, which is in a raised position at this time. The metal shim 116 is placed over the weld line 17 on the ribbon, and the flattening operation is performed in the manner previously described.

One advantage of the embodiment of FIG. 9 is that since the weld line 17 is at an angle of 45° to the ribbon length, a longer joint is produced than is the case when the weld line extends perpendicular to the length of the ribbon. This results in a stronger joint, thereby enhancing the durability of the ribbon.

What is claimed is:

1. A method of bonding together two elements of sheet-like material comprising the steps of:
   A. superimposing one of said elements upon the other;
   B. subjecting a zone on said superimposed elements to compression and ultrasonic vibration to bond said elements together in the area of the zone and also to provide a cutting action, separating the bonded elements into joined pairs;
   C. selecting one of said joined pairs and spreading the joined elements of said selected pair; and
   D. subjecting the bonded zone of said selected pair of elements to further compression and ultrasonic vibration to flatten the bonded zone to substantially the same thickness as the elements.

2. The method of claim 1 in which the ultrasonic vibration is at a rate of approximately 20,000 cycles per second.

3. The method of claim 1 in which step (D) is accomplished by use of a rigid element placed between the joined elements at the bonded zone and the means for applying ultrasonic vibration to said zone.

4. The method of claim 3 in which the rigid element is a thin metal shim.

5. The method of claim 1 in which a first tool having a first configuration is used for applying ultrasonic vibration to the elements for the bonding and cutting operation of step (B) and a second tool having a second configuration is used for applying ultrasonic vibration to the elements for the flattening operation of step (D).

6. The method of claim 5 in which said first tool is made from material of high hardness and presents a relatively small surface to the sheet-like material.

7. The method of claim 5 in which said second tool is provided with a slight bevel parallel to the line of bonding, and presents a relatively large surface to the sheet-like material.

8. The method of claim 1 in which the elements being bonded together are portions of an ink ribbon.

9. The method of claim 8 in which the bond is substantially perpendicular to the length of the ribbon.

10. The method of claim 8 in which the bond is at an angle of approximately 45° with respect to the length of the ribbon.

11. The method of claim 8 in which the ink ribbon is in the form of an endless loop.

12. The method of claim 8 in which the ink ribbon is made of thermoplastic material.

13. The method of claim 12 in which the thermoplastic material is nylon.

14. The method of claim 12 in which the thermoplastic material is polyolefin.

15. Apparatus for bonding together two elements of sheet-like material comprising, in combination,
   first ultrasonic means including a cutting and welding tool, and operable to perform a cutting and welding operation on two superimposed elements of said sheet-like material;

second ultrasonic means including a weld-flattening tool, and operable to perform a weld-flattening operation on a weld joining two elements of said sheet-like material; and a table having retaining means to retain two elements of sheet-like material in superimposed relation on a surface thereof, said table being movable between a first position in which the two superimposed elements are positioned in operative relation to said first ultrasonic means for cutting and welding of said two elements, and a second position in which the two welded elements are positioned in operative relation to said second ultrasonic means for flattening of the weld produced by the first ultrasonic means.

16. The apparatus of claim 15 in which the first and second ultrasonic means are positioned with respect to the table so that the weld line is parallel to the direction of movement of the table.

17. The apparatus of claim 16 in which the retaining means on said table retains the two superimposed elements in aligned relationship in a direction perpendicular to the direction of table movement, so that the weld line is perpendicular to the long dimension of the welded elements.

18. The apparatus of claim 16 in which the retaining means on said table retains the two superimposed elements at an angle of 90° with respect to each other and 45° with respect to the direction of table movement so that the weld line is at an angle of 45° with respect to the long dimension of the welded elements.

19. The apparatus of claim 15 in which the retaining means comprises spring-loaded clamps.

20. The apparatus of claim 15 in which the cutting and welding tool of the first ultrasonic means is made from material of high hardness and presents a relatively small surface to the sheet-like material.

21. The apparatus of claim 15 in which the weld-flattening tool of the second ultrasonic means is provided with a slight bevel parallel to the weld line, and presents a relatively large surface to the sheet-like material.

22. The apparatus of claim 15 in which the second ultrasonic means includes a rigid element placed between the weld-flattening tool and the joined elements of sheet-like material for the flattening operation.

23. The apparatus of claim 21 in which the rigid element is a thin metal shim.

24. The apparatus of claim 15 in which the first and second ultrasonic means operate at a frequency of approximately 20,000 cycles per second.

25. The apparatus of claim 15 in which the first and second ultrasonic means are biased to compress the two superimposed elements during the operations thereon.

* * * * *